United States Patent Office 3,418,202
Patented Dec. 24, 1968

3,418,202
HOT METAL ADHESIVE COMPOSITION
Marion O. Brunson and Kenneth W. Hyche, Kingsport, Tenn., assignors to Eastman Kodak Company, Rochester, N.Y., a corporation of New Jersey
No Drawing. Filed Mar. 17, 1966, Ser. No. 535,026
7 Claims. (Cl. 161—192)

ABSTRACT OF THE DISCLOSURE

Hot melt adhesive compositions useful for adhering stamps, envelopes and the like, and adapted for water reactivation comprising 50 to 80% by weight polyvinyl alcohol of a hydrolysis value not greater than 85 percent containing substantially uniformly dispersed therein 20 to 40% by weight of at least one solid glycol selected from the group consisting of neopentyl glycol and 2,2,4-trimethyl-1,3-pentanediol, and 5 to 15% by weight of normally liquid plasticizer.

---

This invention relates to hot melt adhesive compositions. More particularly it relates to polyvinyl alcohol adhesive compositions containing additives which improve their reactivation by application of water, steam or the like.

A large number of products, such as tapes, trading stamps, postage stamps, labels, decals, envelopes, and the like, are coated with water soluble adhesives from a water solution or suspension. These adhesive coated materials are subsequently run through various types of drying operations to remove the water. Also, a number of products, such as kraft paper, aluminum foil, paperboard, and the like are laminated with water based adhesives. Often problems arise because of slow production speed, inadequate drying, time consuming clean up operations, and slow difficult preparation of the water based adhesives.

The adhesive of this invention finds application in the coating of tape, stamps, labels, envelope flaps, and the like, from a hot melt system in contrast to a water-based system. The resulting adhesive can be reactivated with water or steam to produce strong or fiber-tearing bonds on paper when adhered to various substrates such as aluminum foil, paperboard, glass, and several types of plastic film. Also, the adhesive of this invention finds use in the lamination of various substrates such as paper, aluminum foil, and chipboard to increase production speed, eliminate costly clean-up operations and to produce a superior laminate.

U.S. Patent 3,143,518 has to do with hot melt adhesive compositions reactivatable with water which contain propylene glycol. Substitution of other glycols for the propylene glycol in the compositions of 3,143,518 causes them to become unsuitable as hot melt adhesives due to such factors as crystallization on aging and flaking away from the substrate to which applied. Therefore, it is apparent that providing an improved polyvinyl alcohol hot melt adhesive composition which is of limited susceptibility to crystallizing on aging or flaking away, has better adhesion and blocking resistance when coated on substrates represents a highly desirable object. After extended investigation we have developed an improved polyvinyl alcohol hot melt adhesive composition which exhibits these desired characteristics and is highly useful as an adhesive for envelopes, stamps, decals, and the like, when activated with water or other suitable dispersing medium, and in laminating paper to aluminum foil, glass, and the like.

In its broader aspects our invention involves addition to polyvinyl alcohol of a solid glycol and liquid plasticizer combination. The polyvinyl alcohol of our novel composition has a hydrolysis value of not greater than 85 percent. By hydrolysis value we mean the percentage of acetate groups originally present in the polyvinyl acetate material which have been replaced by hydroxyl groups. A further description is found in U.S. Patent 3,121,701. A hydrolysis value above 85 percent tends to prevent satisfactory plasticizing and to cause degradation at high temperatures such as ordinarily required for application of a hot melt system. Our polyvinyl alcohol hot melt composition with a hydrolysis value greater than 85 percent tends to decompose above 100° C. through loss of water from two adjacent hydroxyl groups, thus leaving double bonds in the chain. With such continued formation of double bonds in conjugate positions at a hydrolysis value of above 85 percent, there is some likelihood of rather severe discoloration. An advantage of our composition is that it may be applied as an adhesive to most surfaces from a hot melt system and later reactivated with water, steam, or the like. For example, it can be used to coat the flap of an envelope. Objects coated with our hot melt composition are generally substantially free of blocking when stacked or rolled together. Also, improved adhesion to substrates such as glass and aluminum foil is secured by their use. The polyvinyl alcohol preferably has a hydrolysis value of 65% to 85% and a molecular weight of 7000 to 15,000.

Preferred solid glycol components are neopentyl glycol (NPG, and 2,2,4-trimethyl-1,3-pentanediol (TMPD). The preferred liquid plasticizer component is glyceryl triacetate (triacetin). More than one water-soluble glycol can be used. The addition of a modifying resin such as polyvinyl acetate, rosin esters, or esters of abietic acid can be used in our hot melt adhesive composition to provide faster setting value or reactivation and to increase bond strength.

Our preferred composition contains at least 50% by weight polyvinyl alcohol (preferably 50 to 80%), 20 to 40% by weight modifying solid glycol, 5 to 15% by weight liquid plasticizer such as the triacetin, and 0 to 10% by weight modifying resin.

Other glycols which can be used in our composition include ethylene glycol, heptamethylene glycol, amylene glycol and pentamethylene glycol. The glycol component can include more than one glycol.

The hot melt compositions of our invention are used in many remoistenable applications, for example, on trading stamps, postage stamps, tapes, envelopes, decals, labels and the like. They can also be used in lamination of substrates such as paper, paperboard, aluminum foil, plastic film, cloth, or the like.

The hot melt adhesive compositions of our invention are formed by heating the plasticizers and glycol to 200 to 250° F., preferably about 215° F., and then adding the polyvinyl alcohol slowly with agitation.

The following examples are illustrative of our invention. In each example the glycol and the glyceryl triacetate (with modifying resin where used) were heated to about 215° F. Before adding the polyvinyl alcohol slowly and with constant agitation. The composition of each example is shown in tabular form in percent by weight.

Example I

| Components | Percent by W. |
|---|---|
| Polyvinyl alcohol | 60 |
| Neopentyl glycol | 30 |
| Glyceryl triacetate | 10 |

The basic formulation of this example provides an excellent remoistenable adhesive for stamps, labels, decals, and the like.

Example II

This example illustrates an adhesive with somewhat faster setting time and one which exhibits a strong bond when applied to substrates such as aluminum foil, glass, and certain plastics.

| Components: | Percent by W. |
|---|---|
| Polyvinyl alcohol | 60 |
| Neopentyl glycol | 25 |
| Glyceryl triacetate | 10 |
| Glyceryl ester of hydrogenated wood rosin | 5 |

Example III

This example illustrates use of TMPD as the glycol in our remoistenable hot melt adhesive. TMPD can be substituted entirely for NPG or used in conjunction with it to lower the melting point of the glycol/plasticizer portion of the formulation. TMPD has a melting point of 50° C.

| Components: | Percent by W. |
|---|---|
| Polyvinyl alcohol | 65 |
| TMPD | 25 |
| Glyceryl triacetate | 10 |

Example IV

This example illustrates further the use of a small amount of modifying rosin, in this instance, wood rosin, in our hot melt composition.

| Components: | Percent by W. |
|---|---|
| Polyvinyl alcohol | 60 |
| TMPD | 25 |
| Glyceryl triacetate | 10 |
| Glyceryl ester of hydrogenated wood rosin | 5 |

Example V

A hot melt remoistenable adhesive consisting of 70 parts polyvinyl alcohol (PVA) and 30 parts propylene glycol was compared with an adhesive consisting of 70 parts polyvinyl alcohol, 20 parts neopentyl glycol (NPG) and 10 parts glyceryl triacetate (triacetin). Blocking and adhesion data are given in the following chart. The blocking point is the temperature at which the paper when wound into rolls or stacked in a heap or pile will stick together.

| Hot melt formulation | Blocking point, ° F. | Adhesion (lbs./inch) | |
|---|---|---|---|
| | | Glass/paper | Paper/Al. Foil |
| 70 PVA—30 propylene glycol | 180 | 0.8 | [1] 0.8 |
| 70 PVA—20 NPG, 10 triacetin | 195 | 3.5 | 0.8 |

[1] No adhesion.

Blocking point was run under 1 p.s.i. weight for 24 hours. For the adhesion tests, one inch wide strips of coated kraft paper were adhered to glass and aluminum foil. These strips were then pulled on an Instron Tensile Tester at a rate of 2 inches per minute. The indicated adhesion is the pounds per inch required to pull the indicated items apart when joined together by the listed composition.

The adhesive compositions of our invention can also include preservatives and/or antioxidants in minute amounts (0.5%), e.g., benzoic acid, sodium benzoate, butylated hydroxy anisole (BHA), or the like.

It is thought apparent from the above illustration that we have provided a polyvinyl alcohol hot melt adhesive composition which is easy to apply and capable of forming a seal of improved permanency when reactivated by water or the like. Further advantages include prevention of crystallization of the adhesive upon aging, formation of a coating with higher blocking resistance (i.e., anti-blocking characteristic), and better adhesion to substrates such as glass and aluminum foil.

Although the invention has been described in detail with reference to preferred embodiments thereof, it will be understood that variations and modifications can be effected within the spirit and scope of the invention as described and claimed.

We claim:

1. The hot melt adhesive composition adapted for water reactivation comprising 50 to 80% by weight polyvinyl alcohol of a hydrolysis value not greater than 85 percent containing substantially uniformly dispersed therein 20 to 40% by weight of at least one solid glycol selected from the group consisting of neopentyl glycol and 2,2,4-trimethyl-1,3-pentanediol, and 5 to 15% by weight of glyceryl triacetate.

2. A composition of claim 1 wherein the polyvinyl alcohol containing the solid glycol and liquid plasticizer also contains from about 2 to about 10% by weight of a modifying resin selected from the group consisting of polyvinyl acetate, rosin esters, and esters of abietic acid.

3. A composition of claim 2 wherein the modifying resin is the glycerol ester of hydrogenated wood rosin.

4. In a method for preparing a polyvinyl alcohol water-moistenable hot melt adhesive composition the improvement which comprises heating 20 to 40% by weight of at least one solid glycol selected from the group consisting of neopentyl glycol and 2,2,4-trimethyl-1,3-pentanediol, and 5 to 15% by weight of glyceryl triacetate to a temperature of 200–250° F. and adding slowly to the heated mixture of glycol and glyceryl triacetate with constant agitation 50 to 80% by weight of a polyvinyl alcohol with a hydrolysis value of 65 to 85%.

5. A composition of claim 1 wherein the polyvinyl alcohol has a hydrolysis value of 65 to 85%.

6. A substrate coated with the composition of claim 2.

7. A laminate comprising paper bonded to a substrate selected from the group consisting of paper, glass and aluminum foil by the composition of claim 2.

References Cited

UNITED STATES PATENTS

| 3,121,701 | 2/1964 | Ingleby | 260—33.4 |
| 3,296,018 | 1/1967 | Sullivan | 117—161 |

OTHER REFERENCES

Skeist, I.: "Handbook of Adhesives," Reinhold Corp., 1962 TP968 S5 C2 (pp. 369, 448 and 450 relied on) (copy in Group 140).

DONALD E. CZAJA, *Primary Examiner.*

WILLIAM E. PARKER, *Assistant Examiner.*

U.S. Cl. X.R.

161—202, 213, 270; 117—122, 124, 132, 155, 161; 260—27, 33.4, 31.6

UNITED STATES PATENT OFFICE
CERTIFICATE OF CORRECTION

Patent No. 3,418,202                                                                  December 24, 196

Marion O. Brunson et al.

It is certified that error appears in the above identified patent and that said Letters Patent are hereby corrected as shown below:

In the heading to the printed specification, in the Title, line 2, "METAL" should read -- MELT --.

Signed and sealed this 17th day of March 1970.

(SEAL)
Attest:

Edward M. Fletcher, Jr.                                    WILLIAM E. SCHUYLER, JR.
Attesting Officer                                                       Commissioner of Patents